Patented July 25, 1950

2,516,674

UNITED STATES PATENT OFFICE 2,516,674

SUBSTITUTED GLYCINAMIDE

William F. Bruce, Havertown, and Joseph Seifter, Willow Grove, Pa., assignors to Wyeth Incorporated, Philadelphia, Pa., a corporation of Delaware No Drawing. Application October 29, 1948, Serial No. 57,417

5 Claims. (Cl. 260—561)

This invention relates to new substituted glycinamides having the general formula $$R'R''NCH_2CONR'''R''''$$

where R' represents an alkyl of 1 to 5 carbon atoms, R'' is an alkyl having 5 to 9 carbon atoms in the molecule and R''' and R'''' are alkyls having 1 to 9 carbon atoms in the molecule, the radicals being either of the branched-chain or straight-chain type and one or more alkyl radicals may have a hydrogen replaced by a hydroxy radical.

We have found, in the preparation and a thorough study of a great number of new, substituted glycinamides that a relatively large number of these compounds evidence marked pharmacological actions hitherto unsuspected in the art and which we considered to be highly useful in the medicinal field. Specifically, we have found that when particular amines are used in the preparation of the compounds of our invention, the glycinamide products evidence useful pharmacological action, more specifically described below.

In general, the compounds of the invention may be synthesized by reacting an appropriate chloracetamide corresponding to the formula $$ClCH_2CONR'''R''''$$

where R''' and R'''' represent alkyls as indicated above with an appropriate secondary amine R'R''NH where R'R'' designate the radicals indicated hereinabove.

The secondary amine may be prepared in the usual and known manner. The preferred method for the preparation of the chloracetamide intermediate involves reacting chloracetyl chloride with a secondary amine R'''R''''NH in the presence of a sufficient amount of benzene or ether to act as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such as higher alcohols having 4 to 7 carbon atoms in the molecule, dioxane or hydrocarbon solvents such as xylene. The amount of solvent used is so selected as to not only dissolve the reactants but to have sufficient for refluxing. The reaction is carried out in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing and the reaction temperature is the refluxing temperature of the particular solvent selected. Generally, a reaction or refluxing time of about 10–15 hours is sufficient for a complete reaction. In the event that solids are formed, these are removed by filtration, the substituted glycinamide product remaining in solution in the solvent. The latter is finally removed by distillation at low pressures to obtain the desired product.

The new compounds have valuable properties and are useful in that they possess at least one of the following actions: local anesthetic, pressor, spasmolytic, analgesic, sedative and convulsant.

It is known that certain amines possess a vasoconstrictor action and are identified as pressor amines. As an important feature of the invention, it has been discovered that when pressor amines are used as intermediates in the preparation of the substituted glycinamides, the new products possess pronounced physiological actions. While pressor amines themselves possess a certain amount of local anesthetic action, a surprising increase in anesthetic action has been found in the corresponding glycinamide compounds.

It has been discovered in the compounds of the invention having the general formula $$R'R''NCH_2CONR'''R''''$$

that when the radical R'R''N is the residue of a secondary pressor amine, a critically new physiological action is found that is different from the physiological action of the secondary pressor amines alone.

These glycinamides, falling within the definition given above, have been found to have surprisingly potent physiological action far exceeding the action of known glycinamides related in structure.

For example, those glycinamides where the number of carbon atoms in R'' is less than 5, show relatively poor pharmacological activity. For example, both alpha-diethylamino-N,N-diethyl acetamide and alpha-diethylamino-N,N-dimethyl acetamide showed an extremely low cocaine potency with equivalent cocaine toxicity. The papaverine potency was zero. It would have normally been expected that other acetamides of this type, such as alpha-di-n-amylamino-N,N-diethyl or n-diamyl acetamide would show a comparably poor potency. Surprisingly, these compounds showed a high spasmolytic potency with practically no toxicity. Still higher carbon groups for R", particularly the branched-chain types, also showed a high papaverine ratio and also in some cases, high cocaine ratios. It has been found, however, that very high molecular weight compounds are difficulty soluble in water and, where the number of carbon atoms in R" is greater than 12, the compounds have been found to have undesirable solubility problems.

In testing the higher homologues, particularly in the case of the branched-chain alkyls, it was also found that the potencies were far superior to that of the methyl or ethyl alpha-disubstituted glycinamides.

Proceeding to a better understanding of the invention, illustrative specific procedures for the preparation of representative compounds falling within the general formula are set forth in the following examples.

EXAMPLE I

*Preparation of alpha - (N - methyl-N-2-heptyl-amino)-N-methyl-N-2-heptyl acetamide*

For the preparation of the appropriate chloracetamide alpha - chloraceto - N - methyl - N-2-heptylamide, 92.5 grams of N-methyl-2-aminoheptane were dissolved in 500 cc. toluene, and 40 grams of chloracetyl chloride were added dropwise thereto with stirring while the reaction flask was kept at a temperature of about −20° C. A precipitate of N-methyl-2-aminoheptane hydrochloride formed during the reaction was removed and the toluene distilled off. The alpha-chloraceto-N-methyl-N - 2 - heptylamide, remaining after distillation of the toluene, distilled at 119–121° C. under a vacuum of 1 mm. Refractive index $N_D^{27}=1.4666$.

A solution of 42 grams of alpha-chloraceto-N-methyl-N-2-heptylamide and 27.5 grams of N-methyl-2-aminoheptane in 500 cc. of n-butanol, together with 250 grams of sodium carbonate, was refluxed for about 12 hours. The solids were filtered off and the filtrate concentrated in vacuo and distilled. The product boiled at 132–137° C. at a pressure of .3 mm. Refractive index $N_D^{20}=1.4593$.

EXAMPLE II

*Preparation of alpha-di-n-amylamino-N,N-diethyl acetamide*

A solution of 10 grams of alpha-chloraceto-N,N-diethylamide and 11 grams of di-n-amylamine, in 50 cc. of n-butanol, together with 12 grams of sodium bicarbonate, was refluxed for 12 hours. The solids were filtered off and the filtrate concentrated in vacuo and distilled. The product boiled at 136–138° C. at a pressure of 3 mm. The yield of alpha-di-n-amylamino-N,N-diethyl acetamide was 11 grams.

By procedures analogous to those described in the above examples, the appropriate secondary amine R'R"NH and the appropriate chloracetamide corresponding to the formula

ClCH₂CONR'''R'''' where R', R", R''' and R'''' represent the radicals indicated above can be reacted to form the following substituted glycinamides representative of those comprehended in this invention.

1. Alpha-(N - methyl - N - 2 - heptylamino)-N-methyl-N-2-(4-methylhexyl) acetamide.
2. Alpha-(N-methyl - N - 1,3 - dimethylpentylamino)-N,N-dimethyl acetamide.
3. Alpha-(N-methyl-N-2 - heptylamino) - N,N-diethyl acetamide.
4. Alpha-(N-methyl-N - 3 - heptylamino) - N,N-diethyl acetamide.
5. Alpha-(N-ethyl - N - 4 - methyl - 2 - heptylamino)-N,N-diethyl acetamide.
6. Alpha-(N - methyl - N - 4 - methyl - 2 - hexylamino)-N,N-diethyl acetamide.
7. Alpha-(N-methyl-N - 5 - methyl - 2 - heptylamino)-N,N-diethyl acetamide.
8. Alpha-(N-methyl-N - 5 - methyl - 2 - hexylamino)-N,N-diethyl acetamide.
9. Alpha-(N-methyl-N-2-octylamino)-N,N - diethyl acetamide.
10. Alpha-(N-ethyl-N-3,6-dimethyl - 2 - heptylamino)-N,N-diethyl acetamide.
11. Alpha-(N-methyl-N-3 - methyl - 2 - heptylamino)-N,N-diethyl acetamide.
12. Alpha-(N-methyl-N-3 - methyl - 2 - hexylamino)-N,N-diethyl acetamide.
13. Alpha-(N-methyl-N - 5 - ethyl - 2 - heptylamino)-N,N-diethyl acetamide.
14. Alpha-(N - hydroxyethyl - 2 - octylamino)-N,N-diethyl acetamide.
15. Alpha-di-n-amylamino - N,N - di - n - amyl acetamide.
16. Alpha-(N-hydroxyethyl-N-3,6-dimethyl - 2-heptylamino)-N,N-diethyl acetamide.

Substantially all of the products of the invention are high boiling liquids having a basic reaction and of limited solubility. It is contemplated that while the products may be used in the basic form, it is within the scope of the invention that they may be prepared and used in the form of their acid-addition salts. The preparation of an acid-addition salt is well-known and generally involves the addition of the selected acid to an ether or alcohol solution of the basic material. The acid is chosen to yield a salt which is known to those skilled in the art as being physiologically non-toxic. As examples, the hydrochloride, sulfate or acetate salts of the products may be used.

It is further contemplated that those substituted glycinamides which are less soluble in dilute acid than 0.5% by weight, or the non-toxic salts thereof, may be brought into satisfactory solution by the use of solubilizing, surface-active, emulsifying or detergent agents in order to obtain a more complete physiological effect of the specific substituted glycinamide. Lipoid solvents having a physiological non-toxic effect such as long-chain fatty acid partial esters of hexitol anhydrides or oxyalkylene derivatives thereof, as for example, sorbitan monolaurate or derivatives thereof, vegetable and animal oils and ointment bases such as cholesterol and petroleum jelly are examples of solvents that have been found useful in admixture with the substituted glycinamides for obtaining an enhanced physiological effect.

Many modifications of the invention will be apparent to those skilled in the art without departure therefrom or from the scope of the claims, it being understood that the foregoing disclosure has been given by way of example for clearness and understanding only and no unnecessary limitations should be implied therefrom.

This application is a continuation-in-part of application Ser. No. 722,068, filed January 14, 1947, now abandoned.

We claim:

1. As new compounds, substituted glycinamides having the formula

R'R''NCH₂CONR'''R'''' where R'R''N stands for the residue of an aliphatic secondary amine having vasoconstrictor action and wherein R' represents an alkyl radical having 1 to 5 carbon atoms, R'' represents an alkyl radical having 5 to 9 carbon atoms while R''' and R'''' represent alkyl radicals having not more than 9 carbon atoms; and non-toxic salts of said compounds.

2. As new compounds, substituted glycinamides having the formula

R'R''NCH₂CONR'''R'''' where R'R''N and R'''R''''N both stand for the residues of aliphatic secondary amines having vasoconstrictor action and wherein R' represents an alkyl radical having 1 to 5 carbon atoms, R'' represents an alkyl radical having 5 to 9 carbon atoms while R''' and R'''' represent alkyl radicals having not more than 9 carbon atoms.

3. Alpha-di-n-amylamino-N,N - diethyl acetamide.

4. Alpha-di-n-amylamino-N,N - di - n - amyl acetamide.

5. Alpha-(N-methyl-N - 2 - heptylamino) - N-methyl-N-2-heptyl acetamide.

WILLIAM F. BRUCE.

REFERENCES CITED

The following references are of record in the file of this patent:

UNITED STATES PATENTS

| Number | Name | Date |
|---|---|---|
| 2,256,186 | Balle et al. | Sept. 16, 1941 |
| 2,328,021 | Katzman | Aug. 31, 1943 |
| 2,411,662 | Martin et al. | Nov. 26, 1946 |

FOREIGN PATENTS

| Number | Country | Date |
|---|---|---|
| 98,236 | Switzerland | Mar. 5, 1940 |